United States Patent
Liu

[11] Patent Number: 5,827,388
[45] Date of Patent: Oct. 27, 1998

[54] HIGH STRENGTH TUBE FABRICATION METHOD UTILIZING A PVC EMULSION

[76] Inventor: Chl Liu, 3/F-2, No. 151, Hsuen-Shih Rd., Taichung City, Taiwan

[21] Appl. No.: 834,220

[22] Filed: Apr. 15, 1997

[51] Int. Cl.⁶ ................................................. B29C 53/36
[52] U.S. Cl. .................. 156/203; 156/218; 156/271; 156/273.3; 427/381; 427/542; 427/595
[58] Field of Search .................... 156/203, 218, 156/271, 273.3; 138/128, 156; 493/302; 427/513, 521, 542, 595, 381

[56] References Cited

U.S. PATENT DOCUMENTS

| | | | |
|---|---|---|---|
| 2,424,315 | 7/1947 | Hyatt et al. | 156/218 |
| 3,409,460 | 11/1968 | Mitchell et al. | 427/542 |
| 3,951,050 | 4/1976 | Poole | 156/203 |

*Primary Examiner*—Richard Crispino
*Attorney, Agent, or Firm*—Rosenberg, Klein & Bilker

[57] ABSTRACT

A high-strength tube fabrication method including the steps of: (a) preparing a polyester yarn gauze, (b) preparing a PVC emulsion, (c) coating the first side of the gauze with a layer of PVC emulsion, (d) steam drying the gauze, (e) coating the second side of the gauze with a layer of PVC emulsion, (e) steam drying the gauze so as to obtain a plastic cloth, (f) baking the plastic cloth to fully dryness, (g) polishing the both sides of the plastic cloth, (h) cutting the polished plastic cloth into strips subject to the size of the tube to be made, (i) sealing each plastic cloth strip into a tube, and (j) rolling up the tube thus obtained into a reel.

1 Claim, 5 Drawing Sheets

HIGH STRENGTH TUBE FABRICATION METHOD UTILIZING A PVC EMULSION

BACKGROUND OF THE INVENTION

The present invention relates to a method of fabricating high-strength tubes, and more particularly to such a high-strength tube fabrication method which is practical for fabricating inexpensive, freezing-resisting, fire proof, corrosion proof high-strength tubes of low wall thickness and different diameters.

Regular plastic tubes for use to deliver water, fluid or air are commonly directly molded from plastics. FIG. 1 shows a structure of plastic tube 10 which is comprised of an inner plastic layer 11, an outer plastic layer 12 covered around the inner plastic layer 11, and a gauze 13 sealed in between the inner plastic layer 11 and the outer plastic layer 12. When the plastic tube 10 is made, it is compressed to form two longitudinal folding lines 14 at two opposite sides along its length by which the plastic tube 10 can be rolled up. However, the formation of the longitudinal folding lines 14 damages the structural strength of the plastic tube 10, and the plastic tube 10 tends to break at the longitudinal folding lines 14. Another drawback of this structure of tube is its heavy weight. Because the inner plastic layer 11 and the outer plastic layer 12 have a certain thickness, the whole weight of the plastic tube 10 is heavy. When the plastic tube 10 is designed for use to deliver a particular fluid or gas, the wall thickness of the plastic tube 10 must be greatly increased because the inside wall of the inner plastic layer 11 cannot be polished to reduce its coarseness. Still another drawing back of this structure of plastic tube is its short service life because its heat-resisting, freezing-resisting and corrosion-resisting power is low. Furthermore, because the plastic tube is made by molding, a particular mold should be prepared for molding a particular size. Therefore, much mold cost should be invested when fabricating different sizes of plastic tubes.

SUMMARY OF THE INVENTION

The present invention has been accomplished to provide a high-strength tube fabricating method which eliminates the aforesaid drawbacks. According to the present invention, the high-strength tube fabrication method includes the steps of: (a) preparing a polyester yarn gauze, (b) preparing a PVC emulsion, (c) coating the first side of the gauze with a layer of PVC emulsion, (d) steam drying the gauze, (e) coating the second side of the gauze with a layer of PVC emulsion, (e) infrared steam drying the gauze so as to obtain a plastic cloth, (f) baking the plastic cloth to fully dryness, (g) polishing the both sides of the plastic cloth, (h) cutting the polished plastic cloth into strips subject to the size of the tube to be made, (i) sealing each plastic cloth strip into a tube, and (j) rolling up the tube thus obtained into a reel.

BRIEF DESCRIPTION OF THE DRAWINGS

FIG. 3A is a sectional view in an enlarged scale taken along line A—A of FIG. 3;

FIG. 3B is a sectional view in an enlarged scale taken along line B—B of FIG. 3;

DETAILED DESCRIPTION OF THE PREFERRED EMBODIMENT

Figure 1:
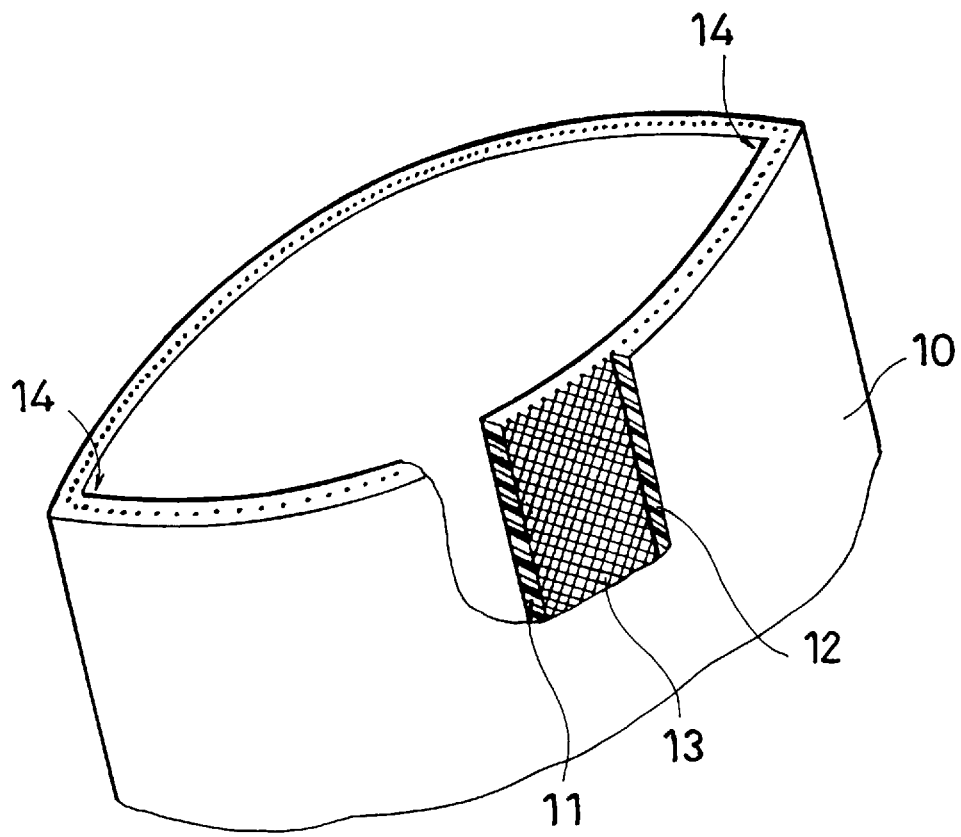
FIG. 1 is a cutaway of a plastic tube according to the prior art.
Figure 2:
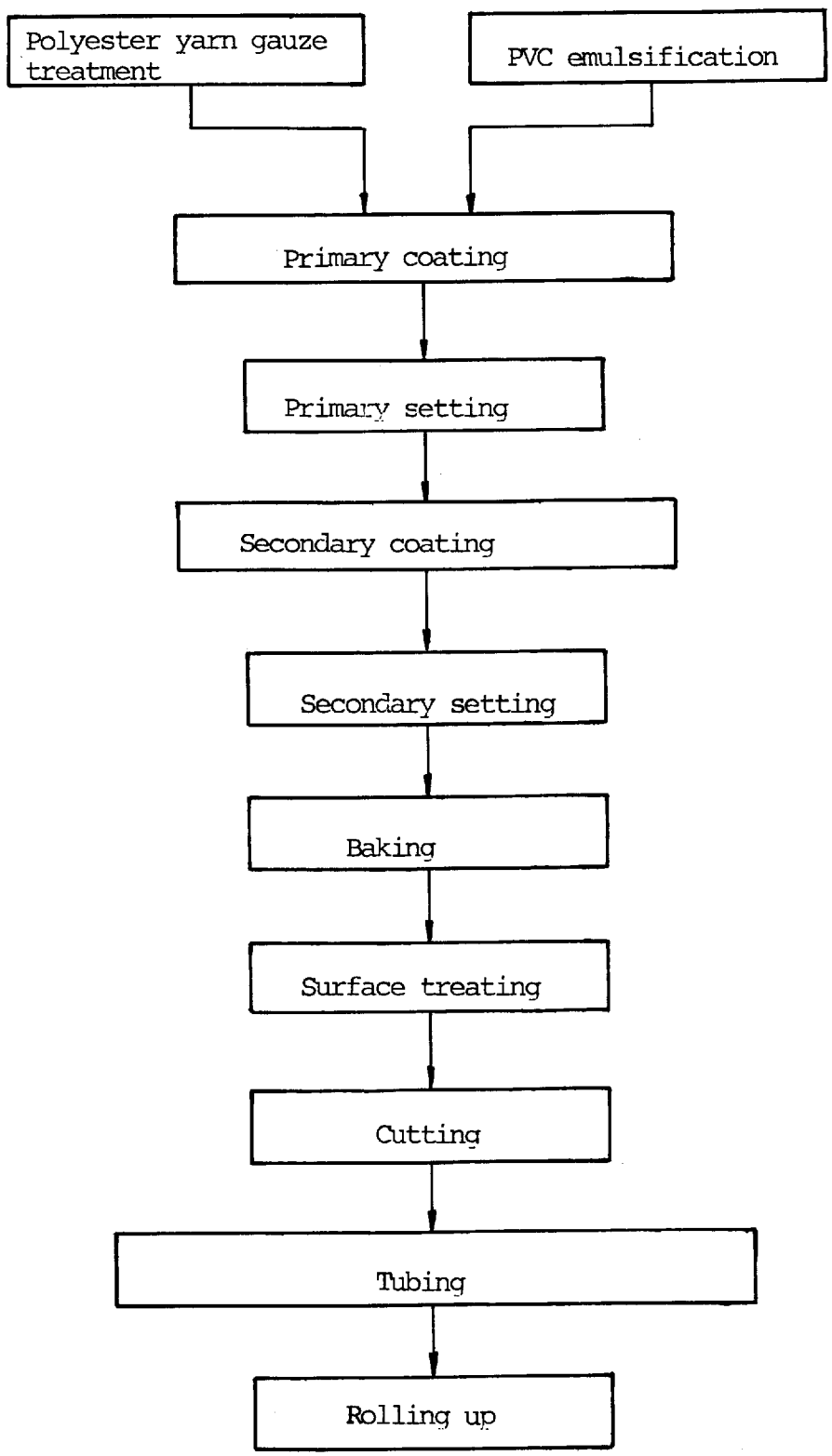
FIG. 2 is a high-strength tube fabrication block diagram according to the present invention.
Figure 3:
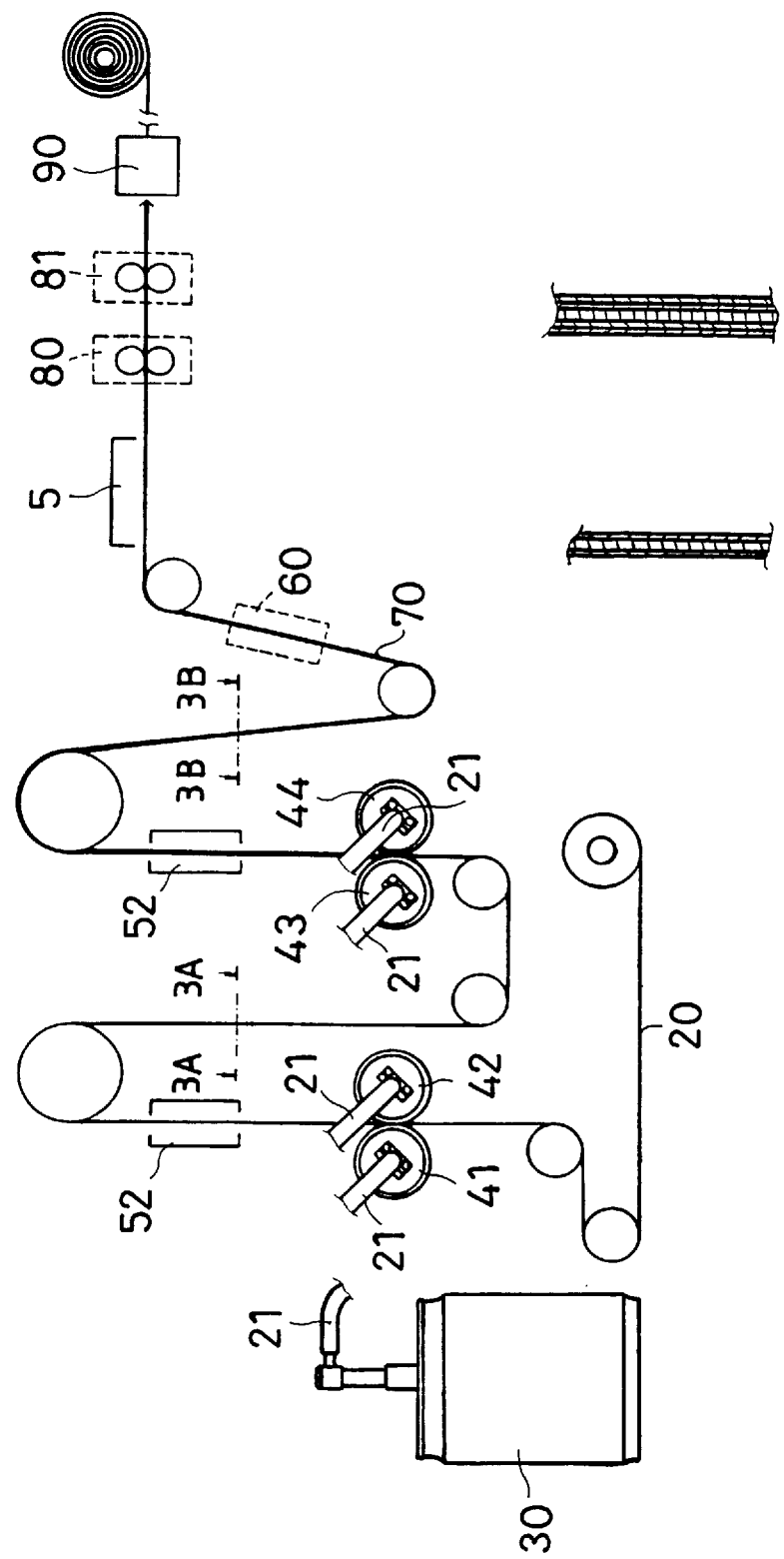
FIG. 3 shows a high-strength tube manufacturing line according to the present invention.

Referring to FIGS. 2 and 3, the flow chart of fabricating a high-strength tube includes the steps of:

I. Polyester Yarn Gauze Treatment

A gauze 20 made from polyester yarn is washed to remove dust, oil and stain, and then mounted on the machine;

II. PVC Emulsification

PVC (polyvinyl chloride resin) is emulsified and added with fire proofing material, anti-sweat material and antiseptics to form a PVC emulsion, and the PVC emulsion thus obtained is contained in an emulsion container 30, permitting the PVC emulsion to be delivered through a piping system 21 to dispensing drums 41;42;43;44;

III. Primary Coating

The gauze 20 is delivered through the first two dispensing drums 41;42, permitting its one side to be coated with a layer of PVC emulsion;

IV. Primary Setting

The PVC emulsion coated gauze is then delivered upwards to an infrared steam bath 52, permitting its PVC emulsion coating to be steam-dried to about 5% dryness;

V. Secondary Coating

The gauze is then delivered from the infrared steam bath 52 to the last two dispensing drums 43;44, permitting its second side to be coated with a layer of PVC emulsion;

VI. Secondary Setting

The secondarily coated gauze is then delivered upwards to another infrared stem bath 52 and steam-dried to about 5% dryness, forming into a plastic cloth 70;

VII. Baking

The plastic cloth 70 is then processed through an anti-sticking treatment device 60, and then delivered to a 220° C. baking oven 53 to be heated to fully dryness;

VIII. Surface Treating

The plastic cloth 70 thus obtained is then delivered to a polishing machine 80 with its both sides polished, so as to improve its tensile strength;

IX. Cutting

The polished plastic cloth 70 is then delivered to a cutting machine 81 and then cut into strips;

X. Tubing

The cloth strips 70 thus obtained are delivered to a wedge type heat-sealing machine 90, and then respectively sealed into a tube.

XI. Rolling Up

The finished tube is than rolled up into a reel.

Figure 4:
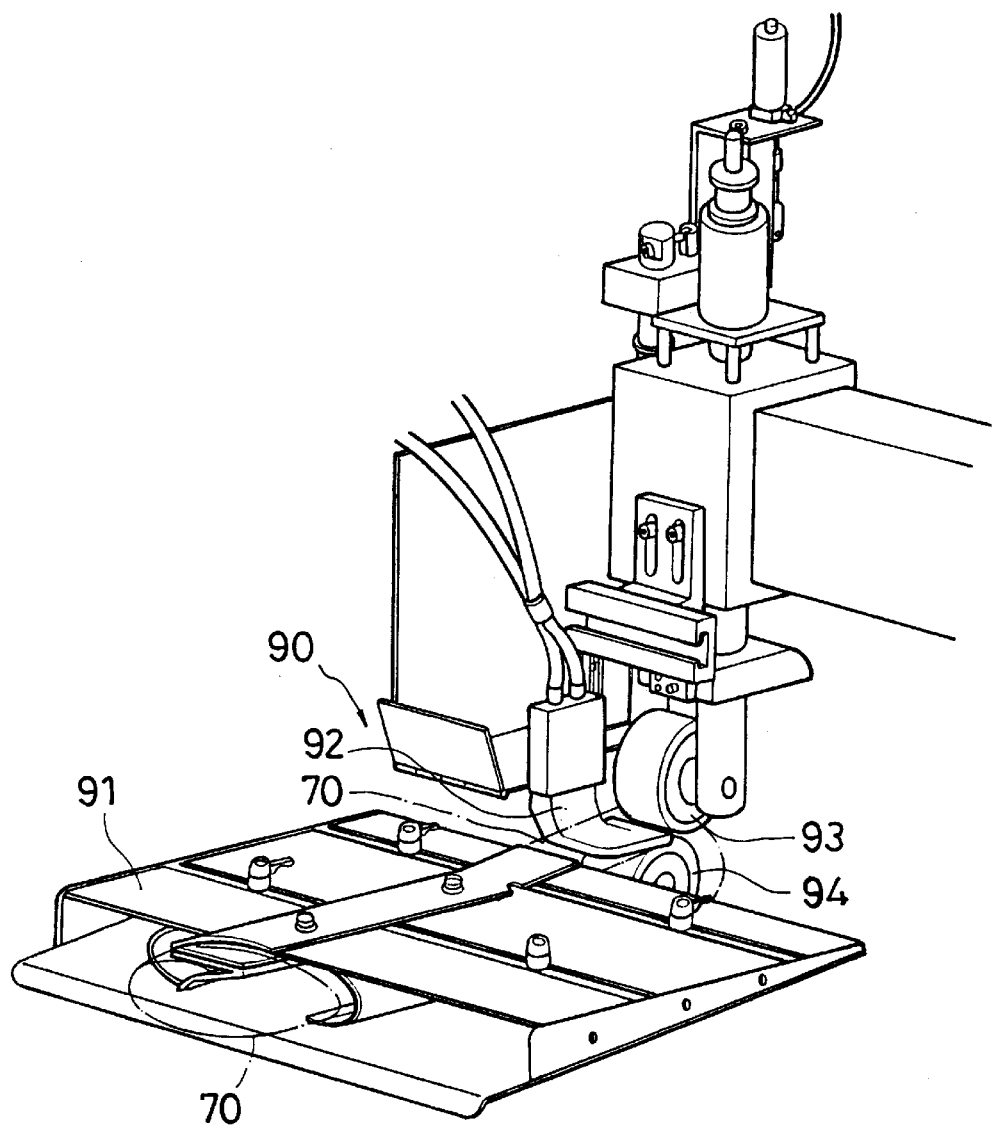
FIG. 4 shows the operation of the wedge type heat-sealing machine according to the present invention.
Figure 5:
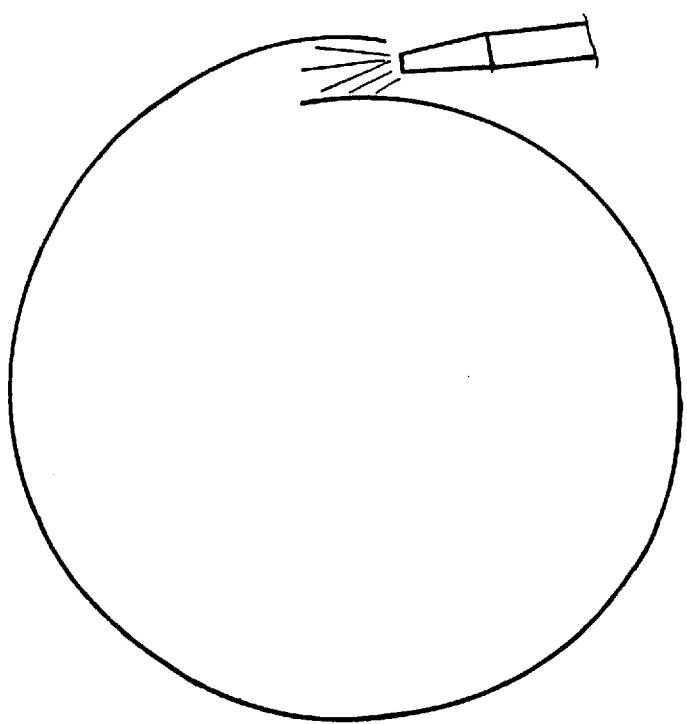
FIG. 5 shows the operation of the hot blaster heater according to the present invention.

Referring to FIGS. 4 and 5, in the aforesaid step X. Tubing, each cloth strip 70 is rolled up into a tubular form and delivered into a hollow, wedge-like frame 91, and then guided from the wedge-like frame 91 through a hot plate 92 and then two impression cylinders 93;94, permitting the overlapped two side edges to be melted and then sealed together (see FIG. 4). Alternatively, a hot blaster heater may be used to seal the overlapped two side edges of the cloth strip 70 being delivered from the wedge-like frame 91 toward the impression cylinders 93;94 (see FIG. 5).

It is to be understood that the drawings are designed for purposes of illustration only, and are not intended as a definition of the limits and scope of the invention disclosed.

What the invention claimed is:

1. A high-strength tube fabrication method comprising the steps of:

i) Polyester yarn gauze treatment in which a gauze made from polyester yarn is washed to remove dust, oil and stains, and then mounted on a high-strength tube fabrication machine;

ii) PVC emulsification in which PVC resin is emulsified and combined with fire proofing material, anti-sweat material and antiseptics to form a PVC emulsion, and the PVC emulsion thus obtained is then contained in an emulsion container, which permits the PVC emulsion to be delivered through a piping system to a first pair of dispensing drums and a second pair of dispensing drums;

iii) Primary coating in which said gauze is delivered through said first pair of dispensing drums, wherein one side of said gauze is coated with a layer of PVC emulsion delivered through said piping system;

iv) Primary setting in which the PVC emulsion coated gauze thus obtained is delivered upwards to a first infrared steam bath, and said PVC emulsion coating is steam-dried to about 5% dryness to form a primarily dried PVC emulsion coated gauze;

v) Secondary coating in which the primarily dried PVC emulsion coated gauze is then delivered from said first infrared steam bath to said second pair of dispensing drums, and a second side is coated with a layer of PVC emulsion delivered through said piping system;

vi) Secondary setting in which the secondarily coated gauze is then delivered upwards to a second infrared steam bath and steam-dried to about 5% dryness, thereby forming the gauze into a plastic cloth;

vii) Baking in which said plastic cloth is processed through an anti-sticking treatment device, and then delivered to a 220° C. baking oven, heated and fully dried;

viii) Surface treating in which the fully dried plastic cloth thus obtained is delivered to a polishing machine and both sides polished;

ix) Cutting in which the polished plastic cloth is delivered to a cutting machine and then cut into strips subject to the size of the tube to be made;

x) Tubing in which the strips obtained form step ix) are delivered to a heat-sealing machine, and then respectively sealed into tubes; and xi) Rolling up in which each sealed tube is rolled up into a reel.

* * * * *

UNITED STATES PATENT AND TRADEMARK OFFICE
CERTIFICATE OF CORRECTION

PATENT NO. : 5,827,388
DATED : 27 OCTOBER 1998
INVENTOR(S) : CHU LIU

It is certified that error appears in the above—identified patent and that said Letters Patent is hereby corrected as shown below:

Title page, item [ 76 ]; Delete the inventor's name "Chl Liu" and insert --Chu Liu--

Signed and Sealed this

Twenty-fourth Day of August, 1999

Attest:

Q. TODD DICKINSON

Attesting Officer     Acting Commissioner of Patents and Trademarks